United States Patent
Suzuki et al.

(10) Patent No.: US 6,420,485 B1
(45) Date of Patent: Jul. 16, 2002

(54) SILOXANE-GRAFTED HYDROCARBON COPOLYMERS

(75) Inventors: Toshio Suzuki; Anne Katja Shim, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 156 days.

(21) Appl. No.: 09/637,165

(22) Filed: Aug. 14, 2000

(51) Int. Cl.$^7$ .................................................. C08F 8/00
(52) U.S. Cl. ...................... 525/288; 525/333.3; 525/342
(58) Field of Search .............................. 525/288, 333.3, 525/342

(56) References Cited

U.S. PATENT DOCUMENTS

| | | | |
|---|---|---|---|
| 3,075,948 A | 1/1963 | Santelli | 260/45.5 |
| 3,634,381 A | 1/1972 | Lehnerer et al. | 260/94.8 |
| 3,646,155 A | 2/1972 | Scott et al. | 260/827 |
| 3,862,265 A | 1/1975 | Steinkamp et al. | 260/878 |
| 4,117,195 A | 9/1978 | Swarbrick et al. | 428/379 |
| 4,245,060 A | 1/1981 | Powers et al. | 525/256 |
| 4,412,042 A | 10/1983 | Matsumura et al. | 525/260 |
| 4,524,187 A | 6/1985 | Greco et al. | 525/332.1 |
| 4,904,732 A | * 2/1990 | Iwahara et al. | 525/100 |
| 5,112,919 A | 5/1992 | Furrer et al. | 525/263 |
| 5,162,445 A | 11/1992 | Powers et al. | 525/333.4 |
| 5,371,144 A | 12/1994 | Borsius et al. | 515/193 |
| 5,426,167 A | 6/1995 | Powers et al. | 526/347 |
| 5,434,221 A | 7/1995 | White et al. | 525/333.6 |
| 5,543,484 A | 8/1996 | Chung et al. | 526/347.1 |

FOREIGN PATENT DOCUMENTS

| | | |
|---|---|---|
| EP | 004034 | 3/1979 |
| EP | 320259 | 12/1988 |
| EP | 821018 | 1/1998 |
| GB | 793581 | 12/1955 |
| GB | 1293671 | 3/1970 |
| WO | WO 96/11959 | 4/1996 |
| WO | WO 98/28347 | 7/1998 |

OTHER PUBLICATIONS

American Chemical Society, Macromolecules, "Metalation, A Novel Route for the Functionalization of Reactive Elastomers. 1. Superbase in the Metalation of Poly(isobvutylene–co–p–methylstyrene)." vol. 29, No. 19, pp. 6081–6089.
Co–pending application—serial No. 09/260,456 as stated in Background section of application.

* cited by examiner

*Primary Examiner*—Bernard Lipman
(74) *Attorney, Agent, or Firm*—Alexander Weitz

(57) ABSTRACT

There is disclosed a silylated copolymer which is the reaction product of:

(A) an olefin copolymer prepared from at least 50 mole percent of at least one $C_4$ to $C_7$ isomonoolefin monomer and at least one vinyl aromatic monomer;

(B) a siloxane having the formula $$Q\text{-}SiR_2(OR_2Si)_n\text{"}SiR'Y_2$$

wherein Q is a monovalent group selected from hydrogen or an olefinically unsaturated hydrocarbon group having 2 to 8 carbon atoms, R is an alkyl group having 1 to 4 carbon atoms, R" is a divalent hydrocarbon group having 1 to 6 carbon atoms, Y is a hydrolyzable organic group, R' is selected from R or Y and n is an integer having a value of 1 to 9; and (C) a free radical generator.

21 Claims, No Drawings

SILOXANE-GRAFTED HYDROCARBON COPOLYMERS

FIELD OF THE INVENTION

The invention relates to curable siloxane-grafted hydrocarbon copolymers which are useful in the formulation of sealant, caulk, adhesive and coating compositions. More particularly, the invention relates to silyl-functional copolymers prepared by reacting an isomonoolefin/vinyl aromatic copolymer with particular siloxanes in the presence of a free radical generator.

BACKGROUND OF THE INVENTION

Various organic polymers having moisture-sensitive silyl functionality are known in the art. Such systems may be prepared, for example, by hydrosilating a polymer having vinylic functionality along its main chain (or at terminal positions) with a reactive group-containing silane which also contains SiH functionality, the reaction being carried out in the presence of a catalyst such as platinum. When hydrocarbon polymers are so modified, they combine advantages inherent in moisture-curable silicone compositions with those of the hydrocarbon. That is, the modified polymer can be crosslinked via the reaction of hydrolyzable silyl groups at room temperature and the low gas and moisture permeability of the organic backbone is maintained. Therefore, such systems are eminently suitable for use as base polymers in sealants for gas barrier applications such as formed-in-place gaskets, O-rings, rubber plugs/seals, medical and food container caps, and the like. However, the hydrosilation methods conventionally used to prepare such modified polymers and their precursors are expensive and complicated.

A different approach for preparing certain polymers having moisture-sensitive silyl functionality has been suggested by Scott in U.S. Pat. No. 3,646,155. This patent teaches that polyethylene, or a copolymer of ethylene with minor portions of propylene and/or butylene, can be reacted with a silane which bears both an aliphatically unsaturated group as well as a hydrolyzable group, the reaction taking place in the molten state and in the presence of a free-radical generating compound. The resulting modified polyethylene was crosslinked by exposing it to moisture, typically steam. Of course, such an ethylene polymer or copolymer generally has a high molecular weight and must be processed at temperatures above the melt point (typically above 140° C. according to Scott). Further, all of the examples of the Scott patent indicate that the melt index, which is inversely related to melt viscosity, actually decreases upon modification with the silane. Scott points out that his cured compositions generally exhibit properties similar to those of corresponding peroxide-cured systems. However, it is clear that the moisture-curable modified polymers taught by Scott must be processed/fabricated at high temperatures and are certainly not suited for the production of room-temperature vulcanizable (RTV) sealant compositions.

Copending application Ser. No. 09/260,456 to Bahadur et al. discloses a method for the preparation of a moisture-curable silyl-functional copolymer wherein a copolymer of isobutylene and a conjugated diene having a number average molecular weight of about 5,000 to 500,000 is reacted with a silane having both an alkenyl group and a silicon-bonded hydrolyzable group, the reaction being carried out in the presence of a free-radical generator. The resulting copolymer exhibits a molecular weight and viscosity which are considerably lower than the corresponding values for the initial unmodified copolymer and it is an ideal base polymer for formulating RTV sealants for gas barrier applications. Likewise, copending application Ser. No. 09/260,455 to Chung et al. discloses a moisture-curable silylated copolymer which is prepared by reacting a copolymer comprising at least 50 mole percent of a $C_4$ to $C_7$ isomonoolefin and a vinyl aromatic monomer with a silane having unsaturated functionality as well as hydrolyzable functionality, the reaction being carried out in the presence of a free radical generator.

SUMMARY OF THE INVENTION

It has now been discovered that the methods employed in the above mentioned copending applications can be followed wherein the silane component is replaced with a siloxane containing a hydrolyzable silyl group separated from a silicon-bonded unsaturated group, or a silicon-bonded hydrogen, by a hydrocarbon linkage. It was particularly surprising that the SiH-functional siloxanes could be readily grafted to a hydrocarbon copolymer using the above mentioned methods. Since the aforementioned functional siloxanes have higher boiling points than the silanes described above, they can be grafted at higher temperatures than latter compounds while remaining relatively less volatile, a major consideration with respect to industrial hygiene in commercial production. Moreover, these siloxanes can also be prepared at a lower cost than a silane having a long alkenyl group such as hexenyltrimethoxysilane, the latter also being somewhat less volatile than a compound such as vinyltrimethoxysilane.

The present invention, therefore, relates to a silylated copolymer which is the reaction product of:

(A) an olefin copolymer prepared from at least 50 mole percent of at least one $C_4$ to $C_7$ isomonoolefin monomer and at least one vinyl aromatic monomer;

(B) a siloxane having the formula $$Q\text{-}SiR_2(OR_2Si)_nR''SiR'Y_2$$

wherein Q is a monovalent group selected from hydrogen or an olefinically unsaturated hydrocarbon group having 2 to 8 carbon atoms, R is an alkyl group having 1 to 4 carbon atoms, R" is a divalent hydrocarbon group having 1 to 6 carbon atoms, Y is a hydrolyzable organic group, R' is selected from R or Y and n is an integer having a value of 1 to 9; and (C) a free radical generator.

DETAILED DESCRIPTION OF THE INVENTION

The copolymers of the invention may be characterized as the addition product of an olefin copolymer radical created by contact of copolymer (A) with a hydrolyzable siloxane (B) in the presence of a free radical generator (C), wherein the siloxane adds to the polymer backbone to produce a siloxane-grafted (siloxane-modified) copolymer product.

Olefin copolymers suitable for modification in accordance with this invention comprise copolymers prepared from monomer mixtures containing at least 50 mole % of at least one $C_4$, to $C_7$ isomonoolefin and from about 0.1 to 50 mole percent of at least one vinyl aromatic monomer. Preferred vinyl aromatic monomers are mono-vinyl aromatics, such as styrene and alpha-methyl styrene; alkyl-substituted styrenes, such as t-butylstyrene; and para-alkyl substituted styrenes wherein the alkyl group contains from 1 to 4 carbon atoms, preferably para-methylstyrene. Suitable isomonoolefin monomers include isobutylene, isopentene, isohexene, isoheptene, and the like. Preferably, 100% of the isomonoolefinic monomer content is isobutylene. Further, it is preferred that component (A) is an elastomeric copolymer prepared from isobutylene and para-methylstyrene which contains about 0.1 to 20 mole % of para-methylstyrene. These copolymers (hereinafter referred to as IPMS) have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than about 5, more preferably less than about 3.5, a glass transition temperature ($T_g$) below about –50° C. and a number average molecular weight ($M_n$) in the range of about 2,000 to 1,000,000, preferably from about 10,000 to 200,000. These copolymers may be prepared by conventional cationic polymerization of the monomer mixture using a Lewis acid catalyst, as well known in the art (e.g., see U.S. Pat. No. 5,162,445).

Another class of olefin copolymers which are useful in the present invention are the metallocene-catalyzed copolymers comprising at least one $C_4$ to $C_7$ isomonoolefin and an alkylstyrene, particularly a $C_1$ to $C_4$ para-alkylstyrene, and most preferably para-methylstyrene (e.g., see U.S. Pat. No. 5,543,484). These copolymers are prepared by solution polymerization of the monomer mixture in the presence of a metallocene catalyst such as zirconocene or titanocene coordination compounds with single or double cyclopentadienyl derivatives in conjunction with an activating co-catalyst such as a Bronsted acid salt. Preferred copolymers of this type are elastomeric copolymers wherein the isomonoolefin content comprises at least 60 mole % of isobutylene. These preferred copolymers have a similar composition, monomer content, $T_g$ and $M_n$ as the IPMS materials described above.

The olefin copolymers useful in the present invention should not contain any significant residual ethylenic unsaturation (e.g., diene, triene or divinyl) since the presence of such unsaturation renders these materials more susceptible to chemical degradation by, e.g., oxygen, ozone and/or sunlight. Thus, the copolymers consist essentially of the monoolefin and vinyl aromatic monomers. Also, the terms "alkylstyrene" or "methylstyrene" are not intended to exclude functionalized styrenes which contain benzylic functionality such as halogen, carboxyl, hydroxy and like functionality, although the presence of such functionality is superfluous for the purposes of the present invention.

Component (B) is a siloxane having the formula

$$Q\text{-SiR}_2(OR_2Si)_nR''SiR'Y_2 \quad (i)$$

wherein Q is a monovalent group selected from hydrogen or an olefinically unsaturated hydrocarbon group having 2 to 8 carbon atoms, the latter preferably being vinyl, allyl, butenyl, 4-pentenyl, 5-hexenyl, cyclohexenyl or cyclopentadienyl, most preferably vinyl. In formula (i), R is an alkyl group having 1 to 4 carbon atoms, preferably methyl. R'' is a branched or linear, divalent hydrocarbon group having 1 to 6 carbon atoms, such as methylene, methylmethylene, ethylene, propylene, butylene and hexylene. Preferably, R'' contains two carbon atoms. Y in formula (i) is a hydrolyzable organic group and is exemplified by alkoxy groups having 1 to 4 carbon atoms, preferably methoxy or ethoxy; acyloxy groups having 2 to 4 carbon atoms, such as acetoxy and propionoxy; oximo groups, such as —ON=C(Me)$_2$, —ON=C(Me)(Et) and —ON=C(Ph)$_2$, in which Me, Et and Ph hereinafter denote methyl, ethyl and phenyl groups, respectively; and substituted amino groups, such as alkylamino and arylamino, including —NH(Me), —NH(Et) and —NH(Ph). Finally, R' of formula (i) is selected from R or Y, preferably Y, and n is an integer having a value of 1 to 9, preferably 1. These siloxanes are known in the art and further description thereof is considered unnecessary.

Modification of the olefin copolymer backbone is carried out by contacting the copolymer (A) and siloxane (B) in a suitable reaction zone, and under reaction conditions, in the presence of free radical generator (C), the latter being either a chemical compound or radiation. Suitable free radical generators include chemical compounds which generate radicals upon thermal decomposition, such as peroxides; compounds which generate free radicals by non-thermal methods, such as photochemical or redox processes; compounds which have inherent radical character, such as molecular oxygen; or electromagnetic radiation, such as x-rays, electron beams, visible or ultraviolet light.

Suitable organic peroxides include hydroperoxides, dialkyl peroxides, diacyl peroxides, peroxyesters, peroxydicarbonates, peroxyketals, ketone peroxides and organosulfonyl peroxides. Preferably, the free radical generator is an organic peroxide having a half-life of less than one tenth of the reaction residence time employed at the reaction temperature under consideration.

When the above described free radical generator is a compound, a suitable molar ratio of free radical generator compound (C) to siloxane (B) may range from 0.001:1 to 1:1, preferably from about 0.01:1 to about 0.1:1. Further, it is preferred that the molar content of the siloxane in the contacting zone is 1 to 10 times the molar content desired in the final grafted copolymer (i.e., an excess of this reactant is preferably employed). Thus, for example, when the molar content of the siloxane in the grafted copolymer is to be 0.05 mmoles per gram of product, the amount of siloxane introduced in the reaction zone should be from about 0.05 to about 0.5 mmoles per gram of copolymer plus siloxane present in the reaction mixture.

The above described grafting reaction may be conducted in the presence of a diluent, such as saturated aliphatic hydrocarbons, aromatic hydrocarbons, and perhalogenated hydrocarbons. Alternatively, when no diluent is employed, the grafting reaction may also be conducted in the bulk phase, wherein the copolymer is in the molten state. The reaction temperature is chosen to be appropriate for the type of free radical generator being used, this preferably being from about 0° C. to about 300° C. For example, when an organic peroxide is used as component (C), suitable temperatures range from about 25° C. to about 250° C., but higher temperatures may be used for other types of free radical initiators. When the reaction is conducted in the presence of a diluent (i.e., solution processes), the reaction temperature will generally be below about 150° C. For melt phase processes (i.e., bulk phase processes), the reaction temperature may range from about 25° C., such as in conventional electron beam irradiation equipment, to about 250° C., such as in polymer mixing equipment. Furthermore, the process for producing the grafted copolymers of the present invention may be conducted as a batch process or as a continuous process. Thus, for example, reaction may take place in a polymer mixing device, such as a Banbury mixer, a single or multiple screw extruder, and the like, for molten polymers or in a glass flask, metal tank or tube when a diluent is added.

It may be desirable to reduce the molecular weight of the grafted copolymer relative to starting component (A). This can be accomplished in several ways, including high shear mixing and extruding, preferably using a twin screw extruder (e.g., as disclosed in U.S. Pat. No. 5,651,927). Extruder breakdown of the polymer can take place at several different steps in the process. The molecular weight breakdown of the olefin copolymer/backbone can be carried out prior to grafting, after the grafting reaction is completed or during the grafting reaction. Preferably, the temperature of the reaction zones in the extruder ranges from about 150° C. to about 300° C. After extruder breakdown, the number average molecular weight of the olefin copolymer/backbone and/or the grafted copolymer preferably ranges from about 20,000 to about 100,000, preferably 25,000 to 70,000.

When the molten copolymer itself is the reaction medium and (C) is a chemical compound, uniform dispersion of components (B) and (C) is preferably performed by pre-dispersion or by the incorporation of suitable mixing elements into the reactor (e.g., incorporation of mixing screw sections in an extruder). When electromagnetic radiation is used, dispersion of the free radical generator will include uniform exposure of all parts of the olefin copolymer, or copolymer solution, to the beam.

Preferably the grafting reaction is conducted such that the resulting siloxane-grafted copolymer contains an average of about 0.5 to about 15, preferably from about 1 to about 5, moles of hydrolyzable silyl groups per molecular chain, as measured by $^1$HNMR (proton nuclear magnetic resonance).

The silylated copolymers of the present invention may be cured by contact with, or exposure to, water (moisture), preferably in the presence of a condensation catalyst. Suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids. Preferred catalysts are organic tin compounds such as dibutyltin dilaurate, dibutyl dimethoxy tin, dibutyltin bis(2,4-pentanedionate) and stannous octoate. The amount of catalyst sufficient to cure the silylated copolymer will generally depend on the specific type selected but will preferably range from about 0.1 to 10 parts by weight per 100 parts by weight of the grafted copolymer.

The silylated copolymers of the invention are ideally suited for use in formulating sealant, adhesive, caulking and coating compositions, particularly sealants for insulating glass constructions. Such compositions may also contain other conventional additives such as fillers, plasticizers, extender oils, colorants, antioxidants, other polymers and the like, as are known in the art. The compositions may be packaged in single anhydrous packages or in two-package systems, one containing an anhydrous composition based on the silylated copolymer and a second package containing a composition containing the catalyst and water wherein the packages are adapted to be mixed prior to application and the resulting composition is cured after application.

EXAMPLES

The following examples are presented to further illustrate the compositions and method of this invention, but are not to be construed as limiting the invention, which is delineated in the appended claims. All parts and percentages in the examples are on a weight basis and all measurements were obtained at approximately 25° C. unless indicated to the contrary.

Example 1

A siloxane according to the present invention was prepared by charging a flask with 55.8 g (0.3 mole) of 1,3-divinyl-1,1,3,3-tetramethyldisiloxane under a nitrogen atmosphere. A platinum/vinylsiloxane catalyst, prepared according to the method described by Hitchcock et al. (*Angew. Chem. Int. Ed. Engl.,* 30, 1991) was added at a level of $10^{-6}$ equivalent of platinum. Acetic acid (0.06 g; 0.001 mol) was introduced and the reaction mixture heated to 60° C. Trimethoxysilane (12.2 g; 0.1 mol) and 0.24 g (0.004 mol) acetic acid were added to an addition funnel and this mixture was slowly added to the flask while the temperature was maintained below 70° C. Subsequently, the reaction mixture was kept at 70° C. for 1 hr. The product was isolated by fractional distillation at 80° C./8 mm Hg to obtain a mixture (confirmed by NMR) of 7% of an α-adduct (1-vinyl-3-(1-trimethoxysilylethyl)-1,1,3,3-tetramethyldisiloxane) having the structure

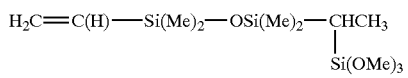

and 93% of a β-adduct (1-vinyl-3-(2-trimethyoxysilylethyl)-1,1,3,3-tetramethyldisiloxane) having the structure

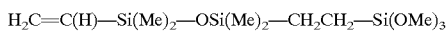

This isolated mixture will hereinafter be called vinyltrimethoxysilylethyldisiloxane (VTMDS).

Example 2

A reaction product between 1,1,3,3-tetramethyldisiloxane and vinyltrimethoxysilane was obtained in a manner similar to that of Example 1 of U.S. Pat. No. 4,808,664 to Saam. The product was a mixture of 30% of an α-adduct (1-(1-trimethoxysilylethyl)-1,1,3,3-tetramethyldisiloxane) having the structure

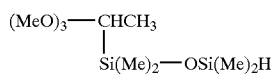

and 70% of a α-adduct (1-(2-trimethoxysilylethyl)-1,1,3,3-tetramethyldisiloxane) having the structure

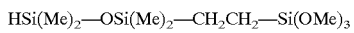

This mixture will hereinafter be called hydridotrimethoxysilylethyl disiloxane (HTMDS).

Example 3

The VTMDS prepared in Example 1 (4.54 g) was added to 49.4 g of XP-50 copolymer in a Haake Rheocord™ mixer fitted with roller blades and the combination was heated at 175° C. for 3 minutes at 200 rpm. The XP-50 was obtained from ExxonMobil Chemical Co. (Baytown, Tex.) and is described as a polyisobutylene-p-methylstyerene copolymer having a number average molecular weight of 160,400 (by GPC using a PIB calibration in tetrahydrofuran solvent) and having 4.6 wt. % p-methylstyerene (PMS) units. Preparation of this copolymer is described in above cited U.S. Pat. No. 5,162,445. A 50% solution of Luperox™ 101 in cyclohexane (1.833 g) was added and mixing was continued for 6 minutes. Luperox™ 101 is described as 2,5-dimethyl-2,5-di(t-butylperoxy)hexane and is marketed by Schibley Chemical Co., Elyria, Ohio. A grafted copolymer was recovered and isolated by precipitation wherein methanol was added to a solution of the reaction product. $^1$H NMR spectroscopy showed resonances at ca. 3.5 ppm and at ca. 0 ppm, corresponding to the protons associated with methoxy group and methyl groups on neighboring silicon atoms, respectively, thus indicating that VTMDS had grafted onto the copolymer. The relative areas of the resonances in the NMR spectrum indicated that this copolymer contained 1.5 weight percent grafted VTMDS. Analysis of the product by gel permeation chromatography (GPC) showed $M_n$=55,200 and $M_w$=115,000.

The above grafted copolymer (1.25 g) was mixed with diisooctyl adipate (1.25 g; viscosity reducer), water-saturated zeolite containing 20% water (0.005 g), and tin catalyst K-Kat™ 8201 (0.075 g), the latter being described as dibutyltin bis(2,4-pentanedioate) and marketed by King Industries, Norwalk, Conn. The resulting catalyzed mixture was immediately placed in a Bohlin VOR Rheometer (Bohlin Instruments, Cranbury, N.J.) set at 50° C. The storage modulus (G') and loss modulus (G") were measured as a function of time. G' increased from about 2,000 Pa to 10,000 Pa within 10 minutes and reached a plateau modulus of 13,000 Pa in 100 minutes. G" remained at 3,200 Pa throughout the test. The fact that the final value of G' was much greater than that of G" is a clear indication that the catalyzed mixture had cured.

Example 4

HTMDS prepared in Example 2 (19.0 g) was added to 180 g of the above described polyisobutylene-p-methylstyrene copolymer in a Haake Rheocord™ mixer fitted with roller blades and heated at 175° C./200 rpm. Luperox™ 101 (3.4 ml; undiluted) was added and the combination mixed for 8 minutes. The grafted polymeric material was recovered, as described above. $^1$H NMR analysis showed resonances at ca. 3.5 ppm and at ca. 0 ppm, the relative areas indicating that this product contained 0.8 weight percent of grafted HTMDS. Analysis of the product by (GPC) showed $M_n$=27, 100 and $M_w$=73,800.

That which is claimed is:

1. A silylated copolymer which is the reaction product of:
(A) an olefin copolymer prepared from at least 50 mole percent of at least one $C_4$ to $C_7$ isomonoolefin monomer and at least one vinyl aromatic monomer;
(B) a siloxane having the formula

wherein Q is a monovalent group selected from hydrogen or an olefinically unsaturated hydrocarbon group having 2 to 8 carbon atoms, R is an alkyl group having 1 to 4 carbon atoms, R" is a divalent hydrocarbon group having 1 to 6 carbon atoms, Y is a hydrolyzable organic group, R' is selected from R or Y and n is an integer having a value of 1 to 9; and
(C) a free radical generator.

2. The silylated copolymer of claim 1, wherein said olefinic copolymer comprises at least 80 mole percent of isobutylene units and 0.1 to 20 mole percent of para-methylstyrene units.

3. The silylated copolymer of claim 1, wherein Y and R' of said siloxane are alkoxy groups having 1 to 4 carbon atoms.

4. The silylated copolymer of claim 1, wherein said free radical generator is an organic peroxide.

5. The silylated copolymer of claim 1, wherein the number average molecular weight of said olefin copolymer is 10,000 to 200,000.

6. The silylated copolymer of claim 1, wherein said olefin copolymer contains an average of from 1 to 5 moles of grafted silyl groups per molecule.

7. The silylated copolymer of claim 1, wherein Q of said siloxane is hydrogen and said olefinic copolymer comprises at least 80 mole percent of isobutylene units and 0.1 to 20 mole percent of para-methylstyrene units.

8. The silylated copolymer of claim 7, wherein R' of said siloxane is Y, Y is methoxy and said free radical generator is an organic peroxide.

9. The silylated copolymer of claim 1, wherein Q of said siloxane is a vinyl group and said olefinic copolymer comprises at least 80 mole percent of isobutylene units and 0.1 to 20 mole percent of para-methylstyrene units.

10. The silylated copolymer of claim 9, wherein Y of said siloxane is methoxy and said free radical generator is an organic peroxide.

11. A process for producing a silylated copolymer, said process comprising contacting:
(A) an olefin copolymer prepared from at least 50 mole percent of at least one $C_4$ to $C_7$ isomonoolefin monomer and at least one vinyl aromatic monomer; and
(B) a siloxane having the formula

wherein Q is a monovalent group selected from hydrogen or an olefinically unsaturated hydrocarbon group having 2 to 8 carbon atoms, R is an alkyl group having 1 to 4 carbon atoms, R" is a divalent hydrocarbon group having 1 to 6 carbon atoms, Y is a hydrolyzable organic group, R' is selected from R or Y and n is an integer having a value of 1 to 9,
said contact being made in the presence of a free radical generator at reaction conditions in a reaction zone.

12. The process of claim 11, wherein said olefinic copolymer comprises at least 80 mole percent of isobutylene units and 0.1 to 20 mole percent of para-methylstyrene units.

13. The process of claim 11, wherein Y and R' of said siloxane are alkoxy groups having 1 to 4 carbon atoms.

14. The process of claim 11, wherein said free radical generator is an organic peroxide.

15. The process of claim 11, wherein the number average molecular weight of said olefin copolymer is 10,000 to 200,000.

16. The process of claim 11, wherein said olefin copolymer contains an average of from 1 to 5 moles of grafted silyl groups per molecule.

17. The process of claim 11, wherein Q of said siloxane is hydrogen and said olefinic copolymer comprises at least 80 mole percent of isobutylene units and 0.1 to 20 mole percent of para-methylstyrene units.

18. The process of claim 17, wherein R' of said siloxane is Y, Y is methoxy and said free radical generator is an organic peroxide.

19. The process of claim 11, wherein Q of said siloxane is a vinyl group and said olefinic copolymer comprises at least 80 mole percent of isobutylene units and 0.1 to 20 mole percent of para-methylstyrene units.

20. The process of claim 19, wherein Y of said siloxane is methoxy and said free radical generator is an organic peroxide.

21. A curable composition comprising:
(I) A silylated copolymer which is the reaction product of:
(A) an olefin copolymer prepared from at least 50 mole percent of at least one $C_4$ to $C_7$ isomonoolefin monomer and at least one vinyl aromatic monomer;

(B) a siloxane having the formula $$Q\text{-SiR}_2(OR_2Si)_n R \text{ SiR'Y}_2$$

wherein Q is a monovalent group selected from hydrogen or an olefinically unsaturated hydrocarbon group having 2 to 8 carbon atoms, R is an alkyl group having 1 to 4 carbon atoms, R" is a divalent hydrocarbon group having 1 to 6 carbon atoms, Y is a hydrolyzable organic group, R' is selected from R or Y and n is an integer having a value of 1 to 9; and (C) a free radical generator, and (II) a sufficient amount of a condensation catalyst to cure said silylated copolymer.

* * * * *